May 11, 1937.　　A. C. RASMUSSEN　　2,079,663
BALL BEARING TURNTABLE
Filed Sept. 17, 1934　　3 Sheets-Sheet 3

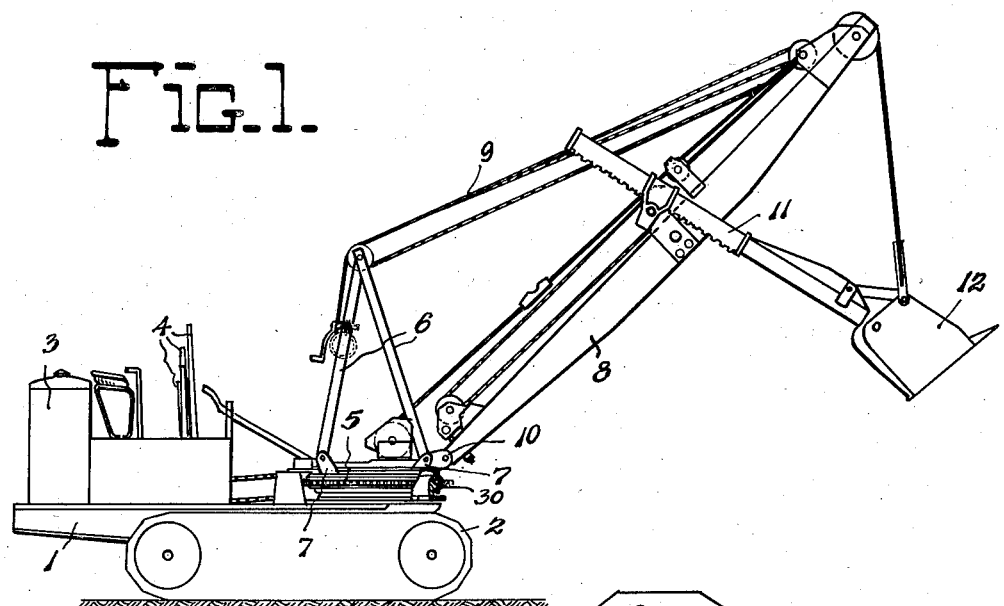

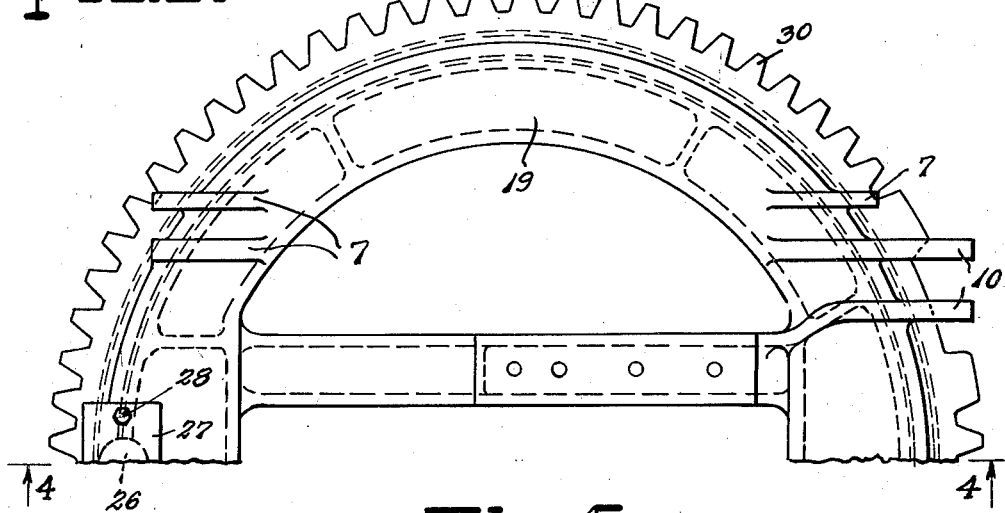
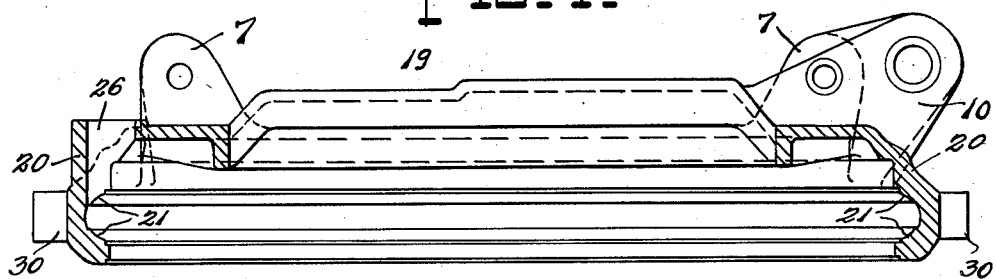
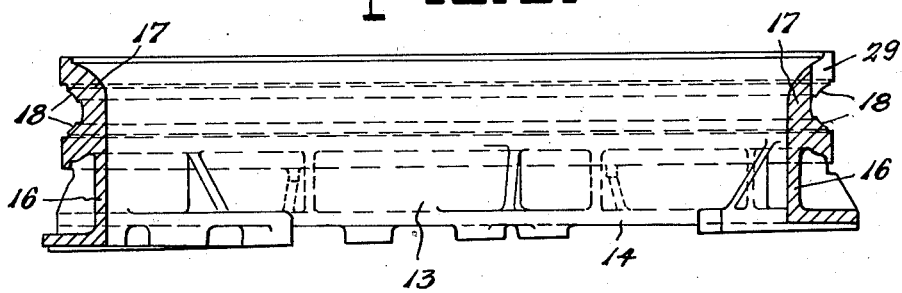

INVENTOR
ALVIN C. RASMUSSEN.
BY
Robb & Robb
ATTORNEYS

Patented May 11, 1937

2,079,663

UNITED STATES PATENT OFFICE 2,079,663

BALL BEARING TURNTABLE

Alvin C. Rasmussen, Indianapolis, Ind., assignor, by mesne assignments, to Insley Manufacturing Corporation, a corporation of Indiana Application September 17, 1934, Serial No. 744,461

16 Claims. (Cl. 212—69)

This invention relates to turntables for excavators, cranes, and the like, and more particularly to an improved ball bearing turntable unit wherein friction is reduced to a minimum, while the construction is comparatively light in weight yet exceptionally sturdy so as to be capable of withstanding the tremendous stresses to which it is subjected when applied to machines of this type. The utility of the invention is by no means confined to excavators and cranes as it will be found to be equally useful in many other applications where heavy loads are to be supported on a rotatable base or platform. The advantages of the invention become most apparent in those conditions where a moment is produced on the bearing by a load that has a lever arm with respect to the bearing, and also where the load on the turntable is not uniformly distributed.

In the conventional turntable constructions it has been the practice to employ rollers on a roller path, which rollers at the front end carry the downward load of the rotating platform and transmit it to the stationary turntable member, there being provided a center-pin to hold the rotatable member in concentric relation with the stationary member and to take the upward pull so as to prevent the platform from tipping over to the front about the front rollers. Such constructions necessitate a much heavier design than is required for my improved turntable, and in addition introduce a number of other disadvantages. Through the use of ball bearings I am enabled to eliminate the customary center-pin and more effectively sustain the loads and stresses which are set up during operation of the machine. I am aware that I am not the first to propose the use of a ball bearing turntable for mechanical shovels and the like. However, in those previous ball bearing constructions a number of disadvantages have been found to exist, notably that there is excessive friction created during rotation of the turntable when the balls pass through the loaded zones, this friction preventing the balls from rolling and thereby materially increasing wear. Under such conditions rotation of the turntable requires more power and a free smooth swing which is so desirable is not attained.

By the way of further explanation of the above, it should be remember that in the case of cranes and shovels the load on the turntable is not uniformly distributed therearound but is more or less concentrated in a zone adjacent the heel of the boom and also in a zone opposite this first zone directly across the turntable. In other words, there is set up a moment of forces tending to tip the turntable, which forces are transmitted to the ball bearing. Now in rotating the turntable to position the boom in the desired direction, the balls of the former ball bearings substantially completely fill the races and creep together as they pass into the loaded zone, and are pressed together so tightly that they cannot individually rotate in the raceways. Therefore, in the loaded zones there is created the friction substantially equivalent to that in a sliding bearing which is many times greater than rolling friction. Accordingly, movement of the turntable, which is forced to take place, must overcome the resistance of the sliding balls in the raceways. Actually a greater force than this is required as the balls become virtually jammed or wedged tightly in the confined travel path. Of course, as the balls pass out of the loaded zones, they readjust themselves and separate slightly, but as soon as they are subjected to any substantial load they wedge together again.

One of the prime objects of the present invention is to provide a ball bearing turntable wherein this wedging and binding tendency of the balls as they creep toward each other under load is restricted so that the balls are permitted to freely roll under all conditions. In this connection it is contemplated to provide spacers between the balls, which spacers are in themselves of novel construction and substantially frictionless.

A further object of the invention is to provide a ball bearing construction having spacer means for maintaining the balls continuously in spaced relation to each other in their raceways, the spacer means being so constructed and arranged that the balls are permitted to move toward each other but without contacting each other when under load, and when relieved of load the weight of the spacer means serves to force or spread the balls apart. In its broadest aspect then, the invention embodies a ball bearing wherein the balls are normally arranged in spaced relation to each other, there being sufficient space afforded to allow the balls to move freely toward and away from each other, subject to the limitation that their movement toward each other is restricted to prevent contact therebetween.

A still further object of the invention is to provide a turntable bearing unit which is substantially sealed against the entrance of dirt and other foreign substances and which enables the continuous retention of a substantial quantity of lubricant therein without appreciable loss. To this end the turntable preferably assumes the form of a stationary base plate having an upstanding flange, in the outer surface of which is formed a raceway, and a rotatable top or revolving member having a depending flange which overhangs and virtually encloses the bearing section of the base plate, there being formed in the inner surface of the depending flange a raceway adapted to cooperate with the base plate raceway in confining the balls which serve to lock the turntable parts together and prevent tipping when loads are applied on the turntable in the form of a force couple, as in the case of excavators, cranes, and the like. Loss of lubricant from the bottom of the bearing may be readily prevented by the use of a retainer gasket or packing which is held in place by a sealing ring.

The construction just described more readily lends itself to practical use than those formerly employed in that it makes possible a more flexible positioning of brackets on the rotatable turntable top for attachment of the boom heel; enables the point of application of the external forces of the boom heel to be brought much closer to the ball bearing, thus saving considerable internal stress and weight in the rotatable frame structure; and affords a greater lever arm on the rotatable frame through the ready adaptability to use with an external swinging pinion as compared with an internal pinion which creates a much shorter lever arm.

Other and further objects and advantages of the invention will be hereinafter set forth and become apparent upon reference to the drawings, and the novel features thereof defined by the appended claims.

In the drawings:

Figure 1 is a side elevation of a portable excavator in which my improved ball bearing turntable is incorporated to great advantage, it being understood that the particular type of excavator shown forms no part of the invention and has been selected solely for the purpose of illustrating the general application thereof through a specific example.

Figure 2 is a vertical sectional view of the assembled turntable unit taken approximately on the longitudinal center of the machine shown in Figure 1.

Figure 3 is a top plan view of a half section of the rotatable upper element or turntable top, it being understood that the omitted section is a duplicate of the section shown.

Figure 4 is a vertical sectional view taken approximately on the line 4—4 of Figure 3.

Figure 5 is a vertical sectional view taken approximately on the longitudinal center of the stationary lower element or base plate.

Figure 6:
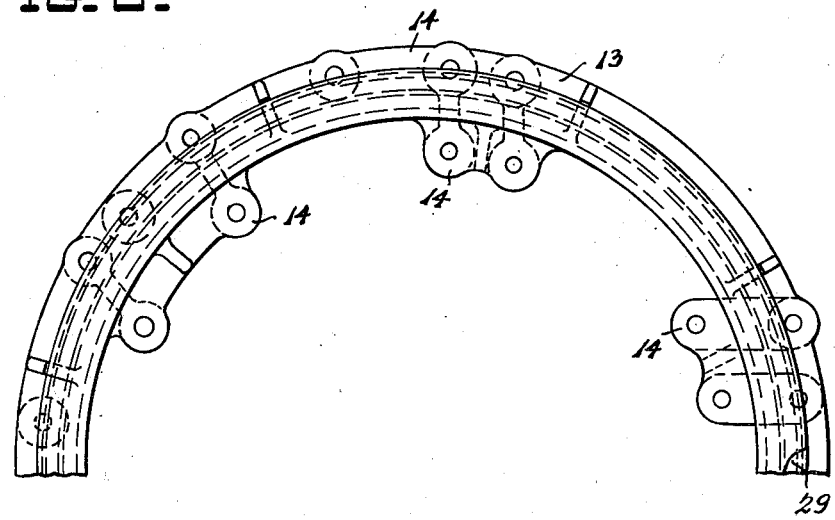
Figure 6 is a top plan view of a half section of the element shown in section in Figure 5.
Figure 7:
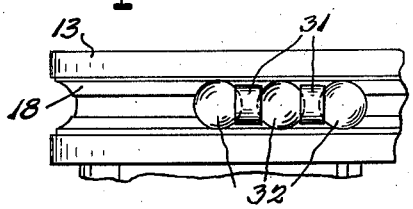

Figure 7 is a fragmentary detail view of one of the ball races, showing the manner in which the balls are assembled therein in spaced relation to each other, the spacers therebetween being shown in the position they assume when the balls are passing through a loaded zone; that is, with the spacers elevated slightly off of the bottom of the race and held by pressure of the balls in such elevated position.

Figure 8:
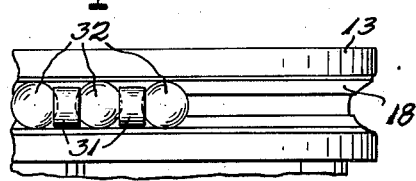

Figure 8 is a view similar to Figure 7, showing the relative positions assumed by the balls and the spacers as the balls pass out of the loaded zone; that is, with the balls forced farther apart by the weight of the spacers and the spacers substantially running on the bottom of the race.

Figure 9:
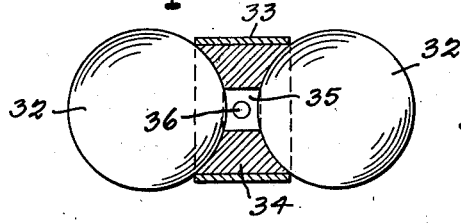

Figure 9 is an enlarged detail view of a pair of the balls and a spacer in the condition illustrated in Figure 7, the balls being in elevation and the spacer in section.

Figure 10:
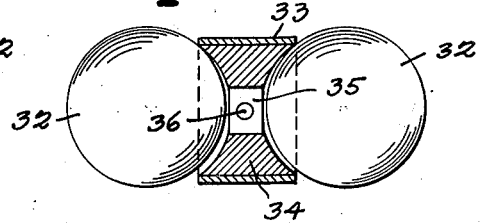

Figure 10 is a view similar to Figure 9, assuming the condition of Figure 8.

Figure 11:
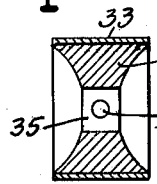

Figure 11 is a longitudinal vertical sectional view through one of the spacers.

Figure 12:
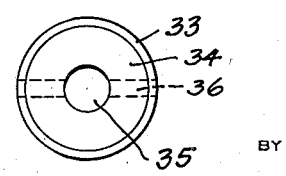

Figure 12 is an end elevation of the spacer shown in Figure 11.

Referring first to Figure 1, there is shown by way of example a portable mechanical shovel which comprises generally a frame 1 mounted upon caterpillar supports 2, the frame serving to mount a suitable motor 3 for operating the machine through controls 4. Mounted upon the frame 1 is a turntable, generally designated 5, which supports the conventional A-frame 6 secured thereto by brackets 7, this A-frame being adapted to sustain the outer end of the boom 8 through adjustable cables 9, the inner end or heel of the boom being secured to the turntable through brackets 10. Mounted upon the boom is a dipper stick 11 carrying a shovel 12 which is operated in the usual manner. It is to be understood that the elements above described may be of conventional design, excepting for the turntable unit, which is of an improved design according to the present invention.

The machine which has been generally illustrated is commonly termed a partial swing machine. However, my improved turntable unit is also applicable and has even greater advantages when applied to a full revolving type machine, whether it be an excavator, crane, or the like.

Passing now to the construction of the turntable unit, the same embodies a lower stationary element or base plate, generally designated 13, provided with a suitable flange 14 at the bottom thereof for attachment to the excavator frame or body through bolts 15. An upstanding flange or web 16 forms an integral part of the base plate and is thickened at its upper extremity as at 17, which thickened portion constitutes the bearing section. A ball race 18 is formed in the thickened portion 17 of the flange 16 so as to extend about the exterior periphery thereof.

Cooperating with the stationary element or base plate is a top or rotatable member generally designated 19. This turntable top is provided with a depending flange 20 on the inner periphery of which is formed a ball race 21 adapted to cooperate with the ball race 18. The turntable top thus overhangs the lower or stationary base so that the upper joint 22 of the bearing is virtually sealed and protected against the entrance of dirt and the weather. The lower joint 23 may be effectively sealed through the use of a gasket or packing 24 which is held in place by a sealing ring 25.

Extending upwardly to the surface of the turntable top in a zone where the force on the bearing is normally in an upward direction is a ball loading slot 26. A cover 27 secured by bolt 28 normally closes this slot or opening. Likewise, formed in the stationary or base plate member is a ball loading slot 29, this slot being preferably located in a zone where the pressure on the bearing is normally in a downward direction. In other words, the loading slots are so located that the ball races are unbroken where the pressure normally occurs. In the case of the machine illustrated, the top loading slot is at the rear of the turntable and the base loading slot is at the front. In order to load the balls it is necessary to remove the boom and turn the turntable top so that the front end is at the rear, bringing the loading slots 26 and 29 into register.

It will be appreciated that the construction just described readily lends itself to a very flexible location of the A-frame brackets 7, and more particularly the boom heel bracket 10, the latter being preferably located close to the ball bearing and substantially over the ball bearing so that the internal stresses are reduced to a minimum. Also, the swing gear 30 may be formed integrally with the turntable top and on the external periphery of the same, thereby increasing the lever arm for rotation of the turntable top.

If, in loading the balls into the races, the races are filled completely with the balls, they will creep toward each other in the loading zones and become firmly wedged together so that they cannot individually rotate as the turntable top is rotated. To avoid this, I employ spacers, generally designated 31, between adjacent balls, the balls being designated 32. As shown, these spacers are made up from a short length of metal tubing 33, such as brass or bronze, and are then filled with Babbitt metal 34 or other suitable anti-friction bearing material. The exposed ends of the Babbitt metal are provided with a curvature which is substantially identical with the curvature of the balls so as to receive and uniformly contact with the surfaces of the adjacent balls. An opening 35 extending axially through the spacer and a transverse opening 36 extending entirely across the spacer are provided so as to prevent the spacers from sticking to the balls through suction. These openings serve to admit air or lubricant which is contained in the bearing.

Instead of constructing the spacers as above described, they may be cast in one piece from some high grade anti-friction bearing material. In either case the diameter of the spacers is somewhat less than the diameter of the balls for a purpose now to be described.

In loading the bearing, the balls and spacers are alternately introduced through the loading slots and there is afforded sufficient space between adjacent balls so that when there is no load on the balls the spacers are permitted to drop down so that they substantially rest on the bottom of the races, as will be clear from reference to Figures 8 and 10. With such an assembly, as the turntable top is rotated during operation of the machine, the balls will creep toward each other as they pass into the loaded zones, through action of an increasing intensity of pressure, but contact between the balls is positively prevented by the spacers. The spacers, being substantially frictionless and providing a substantial contact area with the balls, affording a low unit pressure so as not to rupture the lubricant film between the balls and the spacers, permit individual rotation of the balls to be always maintained. It will be understood that whenever the balls tend to creep toward each other, pressure between adjacent balls raises the intermediate spacers slightly upwardly so that they assume a position suspended intermediate the top and bottom of the races, having in mind that these spacers are slightly smaller than the balls, this suspended position being clearly shown in Figures 7 and 9. As the balls pass out from the loaded zones, they will creep apart again through action of the diminishing intensity of pressure, thereby permitting the weight of the spacers to cam or force the balls apart, the spacers dropping to the bottom of the races so that they run on the bottom in the unloaded zones.

The bearing may be packed with grease, and, owing to the fact that the construction is such that the bearing is effectively sealed, the grease will be retained therein over long periods of time so as to thoroughly lubricate the bearing and without substantial loss. Periodical greasing of the bearing will flush out any grease which may have become hardened through exposure to air.

To further reduce friction in the bearing, it will be observed that the raceways are preferably machined in zones that are 90° apart, thereby providing clearance with respect to the balls intermediate these zones. This construction affords much less friction than were each race so formed as to conform to the contour of the balls over the entire surface.

Referring to Figures 2 and 5 of the drawings, it will be noted that the bottom of the base plate or casting 13 which has been indicated by the reference numeral 14a is inclined toward the front end of the casting and with respect to a horizontal center line 14b of the ball raceway. The bottom 14a of the base casting 13 is bolted to the level frame of the excavator unit with the result that the vertical axis of the ball bearing is thrown out of a perpendicular position, said axis leaning toward the front of the machine. The result of this construction is that when the turntable is swung to the side there is a tendency for it to swing around to the front to the position in which the excavator is most often used for digging. The benefit derived from the arrangement described above is that when the boom is in its front position and the dipper has been loaded there is a tendency for the turntable, when the latter is now swung, to return to said front position. This feature of the present construction permits an easier operation of the reversing clutch and eliminates the excessive wear of the same, and the return of the turntable will be more rapid. It is of considerable advantage to return the empty dipper to digging position as rapidly as possible for it is in swinging the empty bucket that the greatest speed may be used.

The ball bearing turntable structure of the present invention will, as has been stated heretofore, reduce the friction between the turntable and roller bearings considerably, and as a result thereof the power necessary for operating the turntable will be reduced to a minimum.

While the specific details of construction have been herein shown and described, the invention is not confined thereto as changes and alterations may be made without departure from the spirit thereof.

Having thus described my invention, what I claim as new and desire to secure by Letters Patent of the United States, is—

1. A turntable of the class described, comprising a stationary member having a raceway in the outer periphery thereof, a rotatable member superimposed thereon in overhanging relation thereto, the latter member having a raceway in the inner periphery adapted to register with the raceway in the stationary member, balls received in said raceways and serving to secure said members together so as to prevent relative vertical movement therebetween incident to the application of a force couple to one of said members, and means for sealing the lower extremity of the overhanging sides of the rotatable member with respect to the stationary member.

2. A turntable of the class described, comprising a stationary member having a raceway in the outer periphery thereof, a rotatable member superposed thereon in overhanging relation thereto, the latter member having a raceway in the inner periphery adapted to register with the raceway in the stationary member, balls received in said raceways and serving to secure said members together so as to prevent relative vertical movement therebetween incident to the application of a force couple to one of said members, and each of said members having ball loading slots extending from the upper surface thereof to the raceway, said slots being normally out of register and each located in a zone where there is substantially no load on that portion of the raceway.

3. A turntable for rotatable excavators, cranes, and the like, comprising a stationary base member having an upstanding flange formed with a raceway in the external periphery thereof, a rotatable top or supporting frame member having a depending flange within which the aforementioned upstanding flange is received in telescoping relation, said depending flange having a raceway in the internal periphery thereof registering with said first mentioned raceway, a series of balls in said raceways serving to secure said members together while permitting free rotation of said top, means on said top for attaching a boom heel thereto adjacent the edge of the top, said stationary and rotatable member having means for admitting the balls to said cooperating raceways when the top is mounted on the base, said last mentioned means comprising a ball loading slot extending from the upper surface of the top to the top raceway and located substantially opposite to the boom attaching means, and a ball loading slot in said base member extending from the upper extremity thereof to said base raceway and located substantially opposite to the first mentioned loading slot when the boom heel attaching means is disposed in what is normally a forward position, thereby necessitating a relative rotation of said members substantially 180° to bring said loading slots into register to admit the balls to the raceways.

4. A turntable for rotatable excavators, cranes, and the like, comprising a stationary base member having an upstanding flange formed with a raceway in the external periphery thereof, a rotatable top or supporting frame member having a depending flange within which the aforementioned upstanding flange is received in telescoping relation, said depending flange having a raceway in the internal periphery thereof registering with said first mentioned raceway, a series of balls in said raceways serving to secure said members together while permitting free rotation of said top, means on said top for attaching a boom heel thereto adjacent the edge of the top, said stationary and rotatable member having means for admitting the balls to said cooperating raceways when the top is mounted on the base, said last mentioned means comprising a ball loading slot extending from the upper surface of the top to the top raceway and located in a zone where the force applied to the turntable top during use is generally in an upward direction, and a ball loading slot in said base member extending from the upper extremity thereof to said base raceway and located in a zone where the force applied to the base is generally in a downward direction.

5. A turntable unit of the class described, comprising a base member having a raceway therein, a rotatable member having a raceway therein and mounted on said base member through a series of balls disposed intermediate said members and running in said raceways, said balls being less in number than required to fill the raceways, and spacer means interposed between adjacent balls, said balls and spacer means having sufficient space afforded therebetween when assembled in the raceways that the balls are permitted to have unrestrained movement towards and away from each other as they pass into and out of the zones of load resulting from external forces applied to the rotatable member, and the spacer means limiting the movement of the balls toward each other and preventing contact between the balls.

6. A turntable unit of the class described, comprising a base member having a raceway therein, a rotatable member having a raceway therein and mounted on said base member through a series of balls disposed intermediate said members and running in said raceways, said balls being less in number than required to fill the raceways, so as to permit the balls to have unrestrained movement toward and away from each other as they pass into and out of zones of load resulting from external forces applied to the rotatable member, and spacer means interposed between adjacent balls for limiting the movement of the balls toward each other and preventing contact between the balls, said spacer means and balls occupying less space when assembled in the raceways than is required to fill the raceways completely in tightly assembled relation, whereby the spacer means serve to compel a spreading apart of adjacent balls as they pass out of the zones of load.

7. A turntable unit of the class described, comprising a base member having a raceway therein, a rotatable member having a raceway therein and mounted on said base member through a series of balls disposed intermediate said members and running in said raceways, said balls being less in number than required to fill the raceways, so as to permit the balls to have unrestrained movement toward and away from each other as they pass into and out of zones of load resulting from external forces applied to the rotatable member, and spacer means interposed between adjacent balls and loosely assembled therewith in the raceways for limiting the movement of the balls toward each other and preventing contact between the balls, said spacer means also serving to compel by the weight of the spacer means a spreading apart of adjacent balls as they pass out of the zones of load.

8. A turntable unit of the class described, comprising a base member having a raceway therein, a rotatable member having a raceway therein and mounted on said base member through a series of balls disposed intermediate said members and running in said raceways, said balls being less in number than required to fill the raceways, so as to permit the balls to have unrestrained movement toward and away from each other as they pass into and out of the zones of load resulting from external forces applied to the rotatable member, and spacer means interposed between adjacent balls and loosely assembled therewith in the raceways for limiting the movement of the balls toward each other and preventing contact between the balls, said spacer means each having at least one face provided with a cam surface adapted to engage the contiguous ball, which cam face serves to compel a spreading apart of adjacent balls as they pass out of the zones of load.

9. A turntable unit of the class described, comprising a base member having a raceway therein, a rotatable member having a raceway therein and mounted on said base member through a series of balls disposed intermediate said members and running in said raceways, said balls being less in number than required to fill the raceways, so as to permit the balls to have unrestrained movement toward and away from each other as they pass into and out of zones of load resulting from external forces applied to the rotatable member, and spacer means interposed between adjacent balls and loosely assembled therewith in the raceways for limiting the movement of the balls toward each other and preventing contact between the balls, said spacer means each comprising a generally cylindrical body of a diameter slightly less than the diameter of the balls, the ends of said body being shaped to conform to the spherical surfaces of the adjacent balls when the longitudinal axis of the spacer coincides with a line drawn through the centers of the contiguous balls so that the spacers in the loaded zones tend to become suspended in spaced relation to the top and bottom of the raceways incident to the application of pressure on the balls with the result that the balls can approach each other as they roll to the center of maximum pressure in the zones of load.

10. A turntable unit of the class described, comprising a base member having a raceway therein, a rotatable member having a raceway therein and mounted on said base member through a series of balls disposed intermediate said members and running in said raceways, said balls being less in number than required to fill the raceways, so as to permit the balls to freely move toward and away from each other as they pass into and out of zones of load resulting from external forces applied to the rotatable member, and spacer means interposed between adjacent balls for limiting the movement of the balls toward each other and preventing contact between the balls, said spacer means each comprising a generally cylindrical body of a diameter slightly less than the diameter of the balls, the ends of said body being shaped to conform to the spherical surfaces of the adjacent balls when the longitudinal axis of the spacer coincides with a line drawn through the centers of the contiguous balls so that the spacers in the loaded zones tend to become suspended in spaced relation to the top and bottom of the raceways incident to the application of pressure on the balls, with the result that the balls can approach each other as they roll to the center of maximum pressure in the zones of load, said spacers also being provided with means for preventing the same from sticking to the balls by suction.

11. A turntable unit of the class described, comprising a base member having a raceway therein, a rotatable member having a raceway therein and mounted on said base member through a series of balls disposed intermediate said members and running in said raceways, said balls being less in number than required to fill the raceways, so as to permit the balls to freely move toward and away from each other as they pass into and out of the zones of load resulting from external forces applied to the rotatable member, and spacer means interposed between adjacent balls for limiting the movement of the balls, toward each other and preventing contact between the balls, said spacer means each comprising a generally cylindrical body of a diameter slightly less than the diameter of the balls, the ends of said body being shaped to conform to the spherical surfaces of the adjacent balls when the longitudinal axis of the spacer lies in a plane containing the axes of the balls so that the spacers in the loaded zones will be suspended in spaced relation to the top and bottom of the raceways incident to the application of pressure on the balls tending to force them together as they pass through zones of load, and there being sufficient space afforded between the balls and spacers after the bearing is assembled to enable the spacers to drop to the bottom of the raceways by gravity and force the balls apart as they pass out of the zones of load, the shaped ends of the spacer bodies being composed of anti-friction material.

12. As a new article of manufacture, a ball bearing spacer comprising a generally cylindrical body having ball engaging ends shaped to conform to the spherical surface of the balls adapted to be engaged thereby, said body being provided with passages therein and leading to the ball engaging ends for preventing suction action between the ball engaging ends and the balls.

13. As a new article of manufacture, a ball bearing spacer comprising a generally cylindrical body having ball engaging ends shaped to conform to the spherical surface of the balls adapted to be engaged thereby, said body having a longitudinal passage therethrough opening in the face of each ball engaging end, and a passage extending transversely therethrough and intersecting the longitudinal passage.

14. As a new article of manufacture, a ball bearing spacer comprising a tubular body filled with an anti-friction material, the exposed ends of which material are shaped to conform to the spherical surface of the balls adapted to be engaged thereby.

15. A turntable unit of the class described, comprising a base member having a raceway therein, a rotatable member having a raceway therein and mounted on said base member through a series of balls disposed intermediate said members and running in said raceways, and spacer means interposed between adjacent balls and loosely assembled therewith in the raceways so as to permit a limited unrestrained movement of the balls toward and away from each other as they pass into and out of zones of load resulting from external forces applied to the rotatable member.

16. A turntable unit of the class described, comprising a base member having a raceway therein, a rotatable member having a raceway therein and mounted on said base member through a series of balls disposed intermediate said members and running in said raceways, and spacer means interposed between adjacent balls and loosely assembled therewith in the raceways so as to permit a substantial unrestrained movement of the balls toward and away from each other but preventing contact between the balls as they pass into and out of zones of load.

ALVIN C. RASMUSSEN.